Aug. 3, 1965   R. D. BRUNSON ETAL   3,199,112
ELECTRICAL MEASURING APPARATUS
Filed May 8, 1962   2 Sheets-Sheet 1
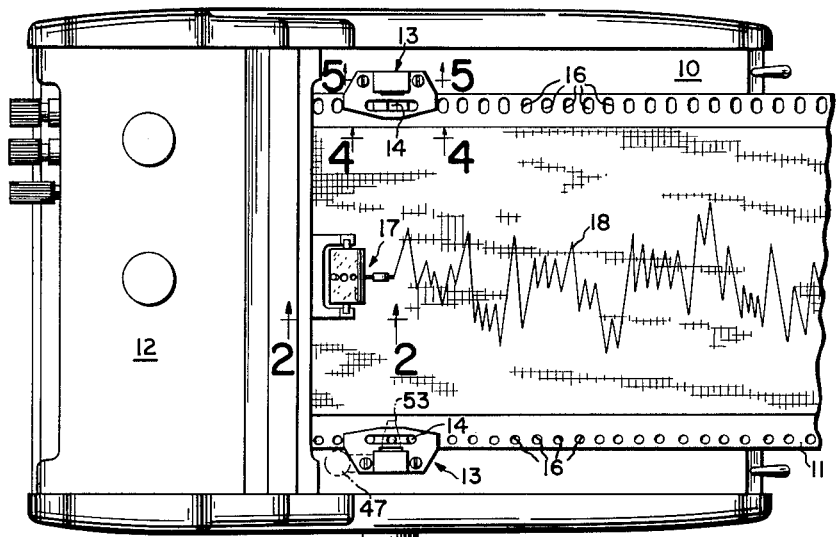
FIG.1
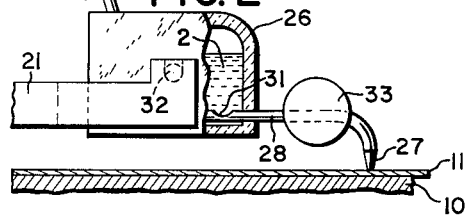
FIG.2
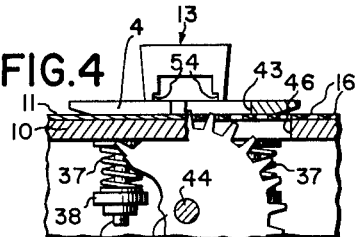
FIG.4
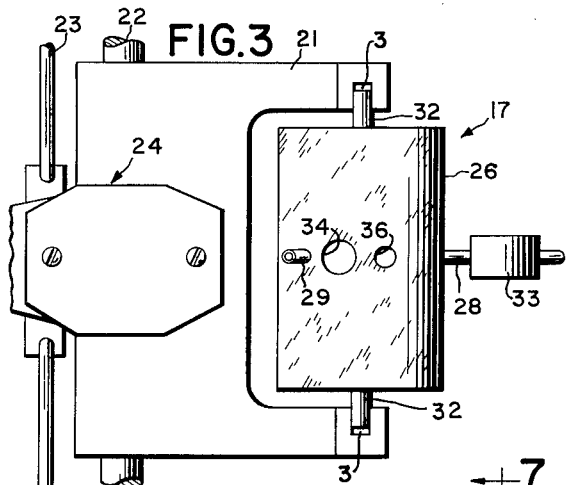
FIG.3
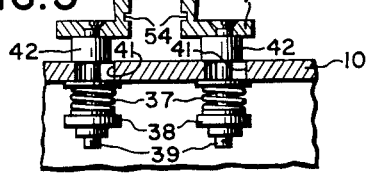
FIG.5
FIG.7
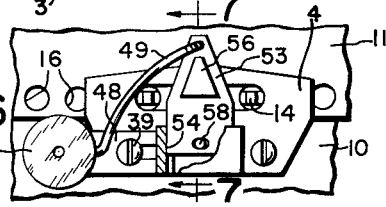
FIG.6
INVENTORS
RAYMOND D. BRUNSON
PAUL A. GILOVICH
STUART K. KINGMAN
BY
ATTORNEY

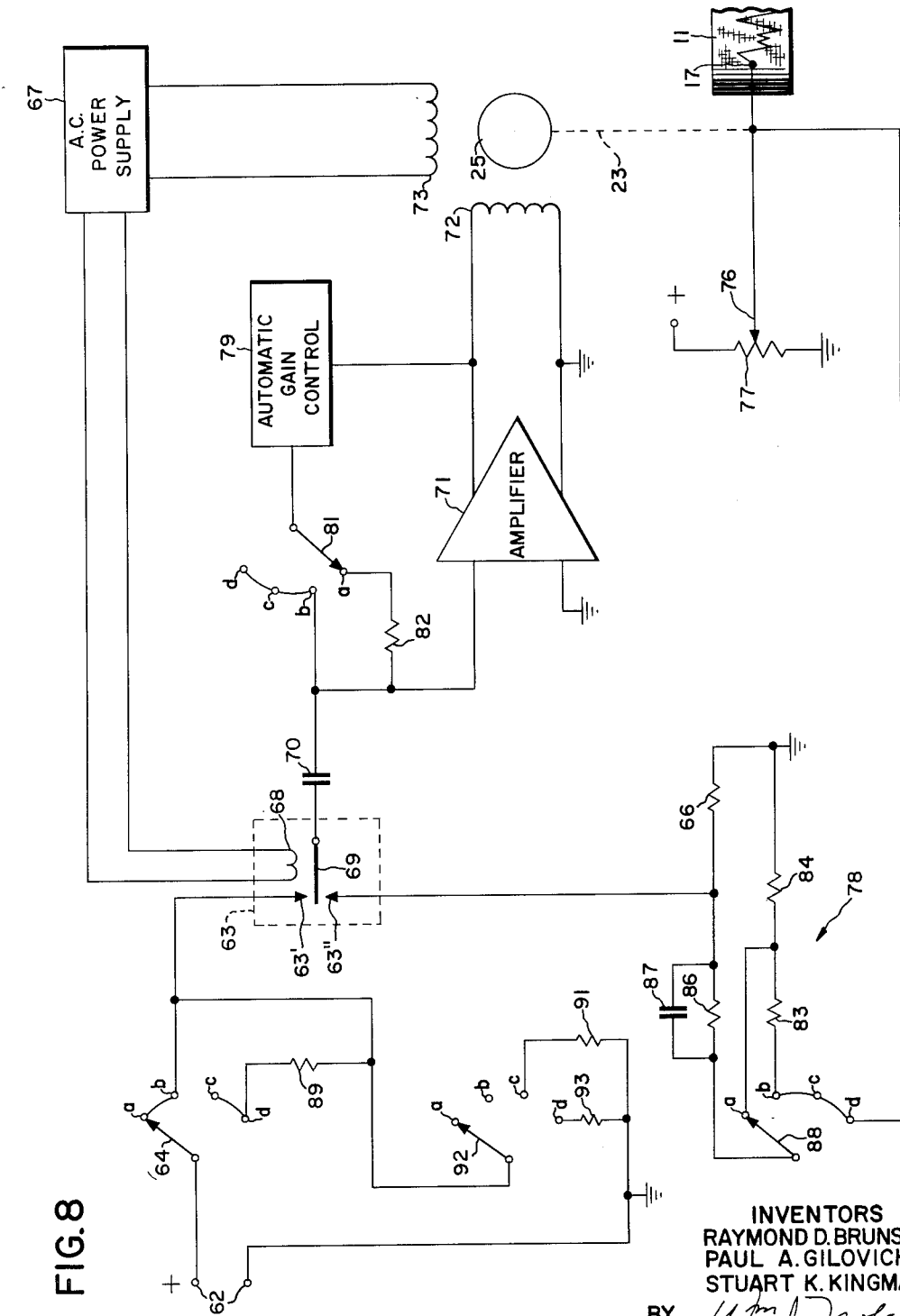

United States Patent Office 3,199,112
Patented Aug. 3, 1965

3,199,112
ELECTRICAL MEASURING APPARATUS
Raymond D. Brunson, Sunnyvale, Paul A. Gilovich, San Jose, and Stuart K. Kingman, Portola Valley, Calif., assignors to Varian Associates, Palo Alto, Calif., a corporation of California
Filed May 8, 1962, Ser. No. 193,038
10 Claims. (Cl. 346—32)

This invention relates in general to electrical measuring apparatus, and more particularly to graphic recorders.

Previously, graphic recorders have usually utilized vertically disposed graph paper with a capillary-type pen. Capillary pens were preferred over gravity-fed pens because capillary pens do not blot when the pen is not writing, the ink being drawn by capillary action to the point of a capillary pen only as it is needed. When using horizontally disposed paper, which is preferable to vertically disposed paper in many situations as where one desires to make notes on the graph paper, it was necessary to use gravity-fed pens which frequently blotted at low speeds or "skip-wrote" at high speeds.

An object of the present invention is to provide a novel pen which enables a curve to be scribed without blotting or "skip-writing."

Also, in the past, plural measuring range instruments usually had a voltage divider resistance circuit across the input terminals thereof so that with high input voltages the apparatus measured only a fraction of the voltage as represented by a portion of the voltage divider circuit. However, the current drawn by this divider circuit can cause an undesirable voltage drop in the voltage source being measured. For example, with measuring a range span of 10 millivolts, a measuring error of as much as 10% can result.

Another object of the present invention is to provide a high accuracy recorder, for example, 1% or better, when recording voltages between zero and one millivolt by having substantially infinite impedance across the measuring terminals.

Since this invention measures voltages less than one millivolt accurately, as well as voltages up to 10 millivolts, another object is to provide means for decreasing the gain of the amplifier circuit when measuring voltages up to 10 millivolts and increasing the gain when measuring voltages up to one millivolt. This procedure prevents saturation of the amplifier circuit. Then, in order to obtain full scale deflection on the graph paper for either one millivolt or ten millivolts still another object is to provide means for changing the reference voltage to swing through the corresponding ranges.

One feature of this invention is the provision of a recorder pen assembly having a tubular member supporting a weight affixed thereto and forming a pen point at one end thereof for recording a curve on a graph paper disposed on the writing surface of a graphic recorder, the pen assembly being pivotally suspended about an axis of rotation and having the center of gravity of the pen assembly disposed between the axis of rotation and the pen point so that substantially uniform pressure may be exerted upon the pen point whereby the pen does not blot at low speeds or "skip-write" at high speeds.

Another feature of this invention is the provision of a simple, hold-down clamp means and an event marker pen that could be lifted off the paper to release the paper and then "snapped" into place to secure the paper whereby new paper can be readily installed on the recorder.

Another feature of this invention is the provision of an amplifying circuit that has substantially infinite impedance when the circuit is set to measure voltage in one or more of the lower ranges and a means is provided for changing the gain therein whenever the amplifier is switched to measure at a different range whereby the circuit in all ranges is almost at saturation but never oversaturated.

Another feature of this invention is the provision of an amplifying circuit that has substantially infinite impedance when the circuit is set to measure voltage in one or more of the lower ranges of voltage, and a means is provided for changing the range of reference-voltage whenever the amplifier is switched to measure a different range whereby the full scale deflection is obtained in the various ranges.

These and other features and advantages will become more apparent upon a perusal of the following descriptions and drawings wherein:

FIG. 1 is a plan view of the recorder with horizontally disposed graph-paper,

FIG. 2 is an elevation of the recorder pen taken on line 2—2 of FIG. 1,

FIG. 3 is an enlarged plan view of the recording pen,

FIG. 4 is a section taken on line 4—4 of FIG. 1,

FIG. 5 is a section taken on line 5—5 of FIG. 1,

FIG. 6 is an enlarged plan view of the hold-down clamp with event marker and ink supply installed, FIG. 7 is a sectional view taken on line 7—7 of FIG. 6, and FIG. 8 is a block circuit diagram for the recorder.

Referring now to the drawings, and to FIG. 1 in particular, a plan view of the recorder 1 is shown having a horizontal plate 10 on which graph paper 11 is disposed to move at a steady speed from left to right as observed in the drawing (the time-axis). The roll from which the graph paper 11 is being unwound is hidden from view by an enclosure 12. Suitable hold-down clamp means 13 (to be explained more fully hereinafter) clamp paper 11 to plate 10. Sprockets 14 (more clearly shown in FIG. 4) engage suitable perforations 16 formed in rows on opposite edges of the paper 11 to move the paper to the right during the recording operation. A gravity-fed pen assembly 17, disposed over the paper, writes a curve 18. Mechanical linkages that actuate the pen assembly 17 are enclosed within the enclosure 12.

Referring to FIGS. 2 and 3 the pen assembly 17 is supported on a pen holder 21 that slides along a bar 22 transversely to the graph paper 11 (the voltage-axis). Pen holder 21 is actuated to slide on bar 22 by an "endless" cord 23 which is fixed to the holder 21 by a suitable fastening means 24. The cord 23, as in most recorders, is actuated by the rotating pulley on a suitable servomotor 25 (FIG. 8). The pen assembly 17 has an ink reservoir 26 and a writing point 27 formed on the end of a very small diameter tube 28, for example, .023 inch outside diameter stainless steel tubing that has its end turned down to form the writing point 27. Tube 28 extends through the ink reservoir 26 so that a fine cleaning wire could be inserted into its upper end 29 to clean out the inside of the tube. Ink 2 enters the tube 28 through an opening 31 formed therein. The pen assembly 17 is supported on the holder 21 so that it is free to rotate on an axis formed by two short axles 32 of pen assembly 17 which fit within slots 3 within holder 21.

Since gravity-fed pens inherently blot when not writing if the opening in the point 27 is large or the head of ink above the point 27 is high or, on the other hand, since the pen will "skip-write" or leave blanks if the point opening is small or the head or ink is relatively low, especially when the pen is moved fast across the paper, various features, either alone or in combination, have been adapted to alleviate this problem as each added feature improves the writing qualities of the pen.

One feature of the pen is to provide a substantially uniform pressure on the pen point. This is accomplished by placing the axles 32 behind the center of gravity of the pen assembly 17 so that the center of gravity lies between the writing point 27 and the axis of rotation through axles 32. The pen assembly 17 is thus positioned above the paper 11 so that the point 27 is substantially perpendicular thereto making the pressure uniform around the opening in the point 27. Also, to ensure further this uniformity of presure around the periphery of the point 27, a line, that is defined by the point 27 and the center of gravity of the pen assembly 17, may be disposed substantially perpendicular to the axis of rotation by means of a metal weight 33. Metal weight 33 is installed on tube 28 as shown and is also disposed to slide along tube 28 whereby the pressure on point 27 may be adjusted and the "best" pressure on the point 27 could be set by the operator.

Even with the proper pressure on the pen point 27 the pen could at times blot. Blotting is prevented by limiting the column or head of ink above the pen point 27. The maximum head of ink so that blotting is prevented generally relates inversely to the diameter of the opening of the pen point 27. But the opening should be large enough to allow sufficient ink to flow when writing at high speeds and at low heads of ink. In this embodiment the point opening was made, for example, .006 inch in diameter wherein the maximum head was limited to, for example, about 5/8 inch. The ink supply within the reservoir 26 is made adequate (for example to continuously write for 24 hours) by increasing the horizontal cross-sectional area thereof.

The reservoir 26 has two ports, a larger port 34 for filling that may be covered when not in use and has a smaller port 36 for venting that is of such a size to prevent ink from splashing out as the pen moves.

Referring to FIGS. 4 and 5, the hold-down clamp means 13 secures the paper 11 and could be readily moved so that the paper could be replaced. This feature is obtained by two spaced compression springs 37 acting between a collar 38 on the end of a machine screw 39, and plate 10. Machine screws 39 are fixed by their head ends to the flat member 4 of the clamp 13 and protrude through openings 41 (FIG. 5) formed in plate 10. Additional collars 42 are disposed on screws 39 against the flat member 13 so that the collars 42 nest within the holes 41 when the clamp 13 is securing the paper. Then, when new paper is to be installed the clamp 13 could be lifted off the plate 10 to a position as shown in FIG. 5 by pulling up and moving it laterally in any desired direction until the collars 42 are not coaxial with openings 41. The collars 42 now would bear against plate 10 to prevent the springs 37 from reseating collars 42 within openings 41.

The flat member 4 has a suitable slot 43 formed therein in way of the sprocket 14. The sprocket 14 is disposed on a rotatable shaft 44 connected to a servo device (not shown) located below the plate 10 whereby the sprocket 14 protrudes through a slot 46 in plate 10 to engage the perforations 16 in the paper 11.

Referring to FIGS. 6 and 7 an event marker pen 5 is shown installed on one of the hold-down clamp means. The event marker 5 has an ink supply 47 supported on a short, light bar 48 that is clamped under the head of one of the screws 39. The ink feeds through a short plastic tube 49 protruding from the bottom of the ink supply 47 and to a writing point 52 which is formed on the end of a metal tube 6 in a similar manner as point 27 was formed. Point 52 is fixed perpendicular to a thin flexible plate 53 that engages two horizontal grooves 54 (more clearly shown in FIG. 5) formed in member 4. A metal weight 56 is fixed on the end of plate 53 so that substantially uniform pressure is maintained upon point 52, even when pen point 52 passes across uneven portions of graph paper 11, for example. The ink supply 47 is also vented and the head of ink above the writing point 52 is also maintained below 5/8 inch. Point 52 is disposed to move a short distance horizontally across the paper 11 along the voltage axis and could be actuated by a force exerted on a bar 57 which is located below plate 10. Bar 57 is fixed to thin plate 53 by a short rod 58 that protrudes through an enlarged opening 59 in plate 10. The horizontal force could be produced for example by a solenoid programmed to a timer (not shown). A force may thereby be exerted upon short rod 58, pressing short rod 58 and flexible plate 53 affixed thereto, thus causing flexible plate 53 to slide within grooves 54 whereby point 52 is moved along the voltage axis, for example. Spring tension means (not shown) may be provided in order to rapidly return flexible plate 53 and pen point 52 to an initial position so that a "pip" (not shown) is formed in a continuous curve (not shown) scribed along the margin of the graph paper 11, for example. When the clamp 13 of FIG. 6 is lifted off the paper, so is the event marker pen. Referring to FIG. 1 the point 52 of the event marker pen (shown by dotted lines) and the point 27 of the recorder are preferably disposed so that a line joining the two points is parallel to the voltage axis.

Referring to FIG. 8 the electrical circuit that powers the recorder is shown in block diagram. An unknown voltage source to be measured is connected across two terminals 62. One of the terminals 62 could be grounded while the other terminal is connected to a chopper 63 through a switch 64. The chopper 63 compares the unknown voltage to a reference-voltage that is developed across a resistor 66 in a manner to be described hereinafter. In the embodiment shown, the chopper is conventional and is mechanically operated in that the alternating current (A.C.), that is supplied by an A.C. source 67 to coil 68, vibrates an armature 69 to make contact alternately to points 63' and 63". An A.C. difference signal develops in armature 69, and passes through a capacitor 70 to where it is amplified by an amplifier 71. The amplified signal is applied to a rebalancing device, for example, a phase coil 72 of the servo-motor 25 which has its other phase coil 73, connected to the A.C. power supply 67. The motor 25 is mechanically coupled in a standard manner by the linkage 23 (shown schematically) to a pick-off 76 of a potentiometer 77 and to the pen 17. The D.C. voltage between the pick-off 76 and ground is divided by a suitable voltage-divider reference-circuit 78 (to be explained more fully hereinafter) to produce the reference voltage across resistor 66.

The amplifier 71 has an automatic gain control circuit 79 in series with a switch 81. Switch 81 switches the gain circuit 79 to be in series with one of at least two separate parallel circuits so that the gain factor could be changed as required.

The gain factor of the automatic gain control 79 is readily changed by increasing the attenuation therein. This is accomplished by placing resistance into or out of the gain circuit so that the voltage drop could be increased or decreased at will. Therefore, to increase the gain of the amplifier 71 when a very low voltage is to be amplified, switch 81 is switched to contact terminal 81a placing a resistor 82 in series therewith. The resistor 82 attenuates the voltage fed back to the amplifier and in a standard manner to produce a relatively high voltage output. The servo-system now responds rapidly and has a small steady state follow-up error. Eventually, as the unknown voltage increases, the amplifier and in turn the magnetic field in coil 72 would saturate and at this point a desirable feature would be to decrease the gain of the amplifier so that higher unknown voltages could be more accurately measured.

The gain of the amplifier 71 is decreased by switching switch 81 to terminal 81b whereby the voltage feedback is now attenuated less reducing the gain of the amplifier, but the output voltage is still substantially the same as when resistor 82 was in the feedback circuit and when a smaller unknown voltage was being measured. The amplifier and in turn the magnetic field produced by coil 72 is prevented from saturating.

Since the gain of the amplifier 71 has two distinct ranges depending on whether resistor 82 is in or out of the series feedback circuit, the reference-voltage across resistor 66 should also sweep through two distinct ranges so that full scale deflection would be obtained for each range. The two ranges are produced by the voltage-divider circuit 78. The circuit 78 has two series resistors 83 and 84 in parallel with the voltage across the potentiometer 77 between the pick-off 76 and ground whereby the voltage is divided between the two resistors 83 and 84. When the low range is to be measured the voltage drop of only one of the resistors, for example 84, is placed across the resistor 66 and an anti-hunting network, comprising a resistor 86 in parallel with capacitor 87. A switch 88 is placed in series with resistor 66 and the anti-hunting network whereby when switch 88 contacts terminal 88b instead of terminal 88a the voltage range across resistor 66 increases as now the total voltage drop across both resistors 83 and 84 is placed across resistor 66 and the anti-hunting network. This feature could be further extended to cause the voltage drop across resistor 66 to scale through a higher range by having a third resistor (not shown) connected between terminals 88b and c and in series with resistors 83 and 84 whereby the voltage between the pick-off 76 and ground would then be divided across three resistors.

This instrument in measuring the next higher unknown voltages uses the voltage divider resistance circuit of the prior art, for example, the unknown voltage is divided across two resistors 89 and 91 by switching switch 64 to terminal 64c whereby placing a switch 92 and the resistors 89 and 91 in series with the unknown voltage. When switch 92 contacts terminal 91c, point 63' is at the same voltage as terminal 92c. Since the unknown voltage to be measured is relatively high, any voltage drop produced would be relatively very small in comparison thereto. If still higher voltages are to be measured, resistor 91 could be replaced with a resistor 93 of a different value.

Switches 64, 81, 88 and 91 each have four terminals, a, b, c and d or four positions whereby they could be "ganged" together so that all switches make contact with their same respective terminal. Thus, the range of the apparatus is conveniently changed.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a graphic recorder of the strip chart variety, means for receiving an unknown voltage that is to be measured, means for moving a graph paper across a flat surface of said recorder, a hold-down clamp means for securing said paper to said recorder surface, said hold-down clamp means including a flat member disposed to bear against said paper, a plurality of rods extending from said flat member each protruding through a hole in said flat surface, said plurality of rods each having a seating collar fixed adjacent said flat member, another supporting collar fixed to its end and a compression spring disposed between and exerting a force upon said supporting collar and the underside of said flat surface, a pen for recording a curve on said paper which curve is representative of the value of said unknown voltage, means for generating a reference voltage representative of the position of said pen upon said paper, chopper means for comparing said unknown voltage to said reference voltage to generate an A.C. signal at a given frequency, amplifier means for amplifying said A.C. signal, a servo-motor having one phase winding energized by an A.C. power supply of said given frequency and having another phase winding energized by said amplified A.C. signal, means on said amplifier means for changing the gain of said amplifier, said means for generating a reference voltage comprising a potentiometer having a movable pick-off arm movable by said servo-motor, a voltage reference resistor connected in series with said pick-off arm and an anti-hunting network across which said reference voltage is generated, and means for obtaining various ranges of voltage drop from said voltage reference resistor as said pick-off arm moves between extreme positions on said potentiometer.

2. In a graphic recorder including a writing surface across which a graph paper is movable and means for recording a curve on said graph paper, hold-down clamp means including a flat member disposed to secure said paper, seating means mounted upon said flat member movable into apertures in said writing surface slidably fitting coaxially therewithin and movable out of said apertures so as to rest off-center of said apertures upon the writing surface edges of said apertures supporting collar means mounted underneath said writing surface, spring means mounted on said supporting collar means, and means threading said flat member and said seating means and passing through said apertures and said spring means and threading said supporting collar means, said spring means being disposed between said supporting collar means and the underside of said writing surface, whereby said flat member may be readily urged against said writing surface to secure said graph paper thereto and said graph paper may be quickly removed from said writing surface by lifting said seating means from said apertures and resting said seating means upon said writing surface apertures edges.

3. In an electrical measuring apparatus including means for receiving and measuring an electrical signal, means for moving a graph paper disposed to travel across a recording surface and a pen movable in variable response to said electrical signal for recording a curve on said paper, improved clamp means for securing said paper against said recording surface, said clamp means including a clamp structure having a flat member disposed to bear against said paper, a plurality of rods extending from said flat member each protruding through a hole in said recording surface, said plurality of rods each having a seating collar mounted upon said flat member and disposed for nesting coaxially within each said hole, each of said plurality of rods also having a supporting collar fixed to one end thereof and a compression spring disposed between each of said seating collars and the underside of said writing surface, and event marking means operable with said clamp means for scribing an event marking curve along one margin of said graph paper comprising an ink supply vessel mounted upon said flat member, a writing point mounted on the end of a thin, flexible member, said thin flexible member being cantilever-mounted on said flat member and having a weight mounted thereon pressing said writing point against said graph paper, a flexible ink supply tube connecting said vessel to said writing point, and means moving said writing point across said graph paper in variable response to a time-dependent signal related to said electrical signal in a predetermined fashion, said event marking means being detachably mounted on said clamp means forming a unitary clamp recording structure readily removable from said holes and supportable on said recording surface off center of said holes for releasing said graph paper from said recording surface at the same time that said writing point is raised from said graph paper and quickly reseatable coaxially within said holes for locking said graph paper onto said recording surface at the same time that said writing point is lowered into contact with said graph paper.

4. In a graphic recorder of the strip chart type including means for receiving an unknown input voltage, means for stepwise attenuating said unknown voltage and pen means for recording a curve on a graph paper which curve is representative of the value of said unknown voltage, means for measuring and recording said unknown voltage comprising means for generating a reference voltage representative of the position of said writing means upon said paper, chopper means comparing said unknown voltage with said reference voltage and generating an A.C. difference signal at a given frequency, amplifier means for amplifying said A.C. signal, a servo-motor having one phase winding energized by an A.C. power supply of said given frequency and having another phase winding energized by said amplified A.C. signal, and means associated with said amplifier means for changing the gain thereof comprising a gain control feedback circuit including gain control means and switch means in series with said gain control means switching resistive means into or out of said feedback circuit and operable with said stepwise adjustable attenuating means, whereby said resistive means is switched into series with said gain control means to adjust the gain of said amplifier means for measuring very low input voltages in the lowest first voltage range of said recorder and is switched out of said feedback circuit for measuring voltages in a second voltage range higher than said first voltage range of said recorder and is also switched out of said feedback circuit in a plurality of voltage ranges higher than said second voltage range of said recorder while said attenuating means stepwise increasingly attenuates said unknown input voltages in said plurality of higher voltages ranges of said graphic recorder, whereby said very low input voltages may be measured very accurately in said lowest first voltage range without impairing the accuracy of measurement in said higher voltage ranges.

5. In a graphic recorder according to claim 4, wherein said means for generating said reference voltage comprises a potentiometer adapted to be energized by a D.C. power supply and having a movable pick-off arm movable by said servo-motor, a voltage divider anti-hunting reference circuit connected in series with said pick-off arm and said shopper means, said voltage divider anti-hunting reference circuit comprising a first voltage dividing circuit stage and switching means for stepwise adjusting the voltage division produced by said first voltage dividing circuit stage and a second anti-hunting voltage dividing circuit stage connected across said first voltage dividing circuit stage including a reference voltage resistor across which said reference voltage is developed, said switching means producing voltage division across said first voltage dividing circuit stage only in said lowest voltage range of said recorder.

6. In a graphic recorder of the strip-chart type having means for receiving and measuring an electrical signal, means for moving a graph paper across a recording surface of said recorder at a fixed rate, and means for securing said graph paper to said recording surface, improved recording means movable across said recording surface in a direction perpendicular to the direction of motion of said graph paper in variable accordance with said electrical signal comprising writing means, reservoir means for supplying a writing fluid to said writing means, said writing means including a hollow, tubular member having one end thereof formed into a writing tip disposed in contact with said graph paper and the other end extending into said reservoir means, slotted supporting means holding said reservoir means and said writing means, said reservoir means having axle means defining an axis of rotation therethrough and being supported by said slotted supporting means, and means positioning the center of gravity of said reservoir and writing means between said axis of rotation and said writing means so that said writing means is pressed against said recording surface under substantially uniform pressure, said positioning means including a metallic weight slideably mounted upon said hollow, tubular member, whereby said recording means may be moved across said graph paper for scribing a curve thereon without said writing means blotting at low rates of movement thereacross and without said writing means skipping across said graph paper whenever said recording means is moved very rapidly across said graph paper and said center of gravity is adjustably located between said axis of rotation and said writing point.

7. In a graphic recorder according to claim 6, wherein said center of gravity is disposed so that a line through the said center of gravity and said writing tip is substantially perpendicular to said axis of rotation about which said recording means is disposed to rotate.

8. In a graphic recorder according to claim 7, wherein said securing means comprises a clamp structure having a flat member and a slotted member protruding from said flat member, said flat member being disposed to bear against said graph paper, a plurality of screws extending through said flat member each threading through apertures in said recording surface and each threading through one of a plurality of seating collars, said seating collars and said clamp structure forming a rigid seating structure being readily movable out of said apertures in said recording surface and supportable off-center of said apertures upon the lateral edges of the recording surface surrounding said apertures releasing said paper from said recording surface, said plurality of screws each passing through a compression spring member and threading a supporting collar, each said compression spring member being disposed between one of said seating collars and the underside of said writing surface and being adapted to quickly seat said seating collars in said apertures whenever said seating collars are disposed coaxial said apertures, whereby said graph paper readily may be locked onto said recording surface and quickly may be removed therefrom.

9. In a graphic recorder according to claim 8, further including event marking means mounted upon said clamp means and operable together therewith for recording the occurrence of an event upon one edge of said graph paper comprising an ink supply vessel mounted upon said flat member, a writing point mounted on the end of a thin flexible member cantilever-mounted on said flat member, a weight mounted upon said thin flexible member near one end thereof pressing said writing point against said paper, a flexible ink supply tube connecting said vessel to said writing point, and servo-mechanical means moving said writing point across said graph paper in a transverse direction perpendicular to the direction of motion of said graph paper in response to an event marking signal associated with or related to said electrical signal, said slotted member having two grooves engaging two edges of said thin flexible member, whereby said thin flexible member slides within said grooves in response to said event marking signal.

10. In a graphic recorder according to claim 9, wherein said servo-mechanical means includes a short connecting rod rigidly mounted on said thin flexible member and extending through an aperture in said recording surface, said connecting rod being fixed to a bar means disposed below said recording surface and adapted to be movable along said transverse direction by control means responsive to said event marking signal.

References Cited by the Examiner

UNITED STATES PATENTS

| 1,906,514 | 5/33 | Beck | 346—139 |
| 2,577,073 | 12/51 | Dell | 101—415.1 |
| 2,655,426 | 10/53 | Barnes | 346—32 |
| 2,850,971 | 9/58 | Brodie | 101—415.1 |
| 2,973,237 | 2/61 | Whiteley | 346—140 |
| 3,015,536 | 1/62 | Nielsen et al. | 346—136 |
| 3,018,153 | 1/62 | Steen | 346—139 |
| 3,054,109 | 9/62 | Brown | 346—140 |

LEO SMILOW, *Primary Examiner.*